United States Patent
Pitt et al.

(10) Patent No.: US 8,931,714 B1
(45) Date of Patent: Jan. 13, 2015

(54) APPARATUS AND METHOD FOR AN IMPROVED SYNTHETIC JET ACTUATOR

(75) Inventors: Dale M. Pitt, Afton, MO (US); Bradley W. Sexton, Richmond Heights, MO (US)

(73) Assignee: The Boeing Company, Chicago, IL (US)

( * ) Notice: Subject to any disclaimer, the term of this patent is extended or adjusted under 35 U.S.C. 154(b) by 527 days.

(21) Appl. No.: 12/886,126

(22) Filed: Sep. 20, 2010

(51) Int. Cl.
  *B05B 1/08* (2006.01)
(52) U.S. Cl.
  USPC ................................... 239/102.2; 239/102.1
(58) Field of Classification Search
  CPC  B05B 17/06; B05B 17/0607; B05B 17/0615; B05B 17/0646
  USPC ............... 239/102.2, 102.1, 589, 589.1, 602, 239/DIG. 19; 347/10, 68; 244/204.1, 207; 310/311
  See application file for complete search history.

(56) References Cited

U.S. PATENT DOCUMENTS

| | | | |
|---|---|---|---|
| 4,465,234 A * | 8/1984 | Maehara et al. | 239/102.2 |
| 4,702,418 A * | 10/1987 | Carter et al. | 239/101 |
| 5,261,601 A * | 11/1993 | Ross et al. | 239/102.2 |
| 5,758,823 A | 6/1998 | Glezer et al. | |
| 5,957,413 A | 9/1999 | Glezer et al. | |
| 6,412,732 B1 | 7/2002 | Amitay et al. | |
| 6,722,581 B2 * | 4/2004 | Saddoughi | 239/102.2 |
| 8,235,309 B2 * | 8/2012 | Xu et al. | 239/102.2 |

OTHER PUBLICATIONS

Amitay, M., Pitt, Dale M., Glezer, A., "Separation Control in Duct Flows", Journal of Aircraft, vol. 39, No. 4, pp. 616-620, Jul.-Aug. 2002.
Krishnan, G., and Mohseni, K., "Axisymmetric Synthetic Jets: An Experimental and Theoretical Examination", AIAA Journal, vol. 47, No. 10, Oct. 2009, pp. 2273-2283.

* cited by examiner

*Primary Examiner* — Davis Hwu
(74) *Attorney, Agent, or Firm* — Felix L. Fischer

(57) ABSTRACT

A synthetic jet actuator employs a case having a cavity with an orifice. An intermediate interface is contained within the case adjacent the cavity. The intermediate interfaced is excited in a sloshing mode to expand or reduce the volume of the cavity thereby entraining air into or expelling air from the cavity.

6 Claims, 5 Drawing Sheets

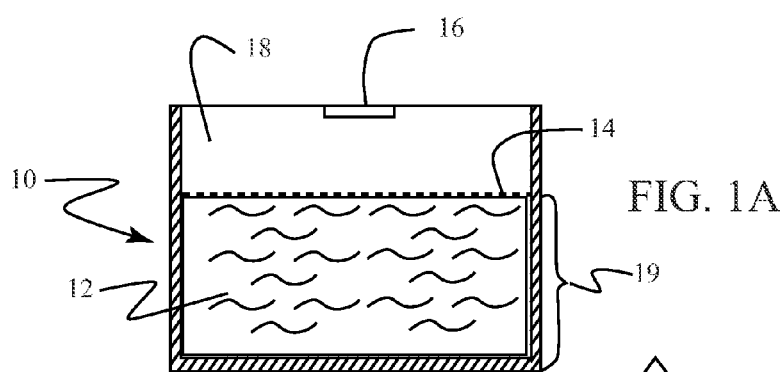
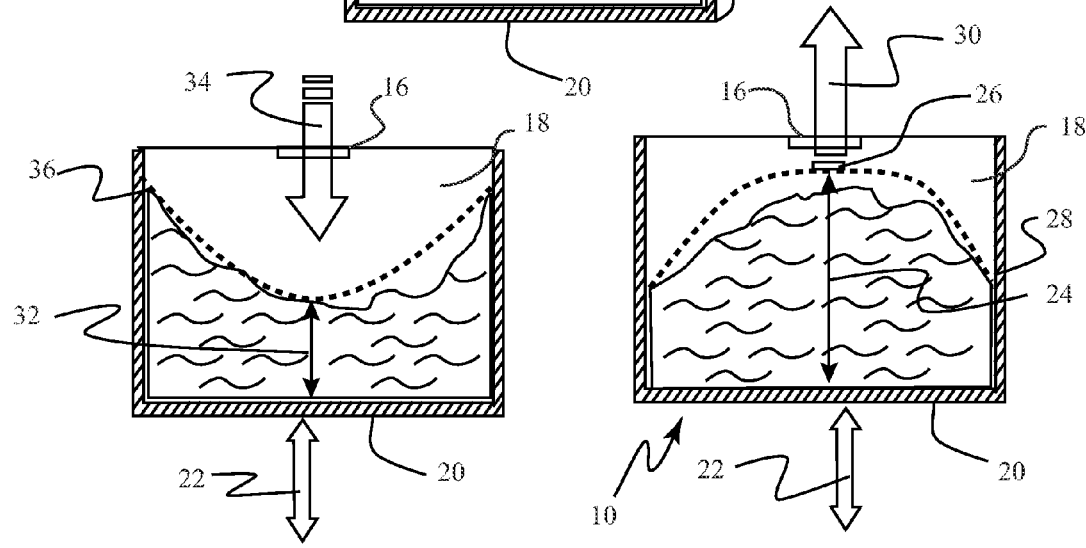
FIG. 1A
FIG. 1C
FIG. 1B

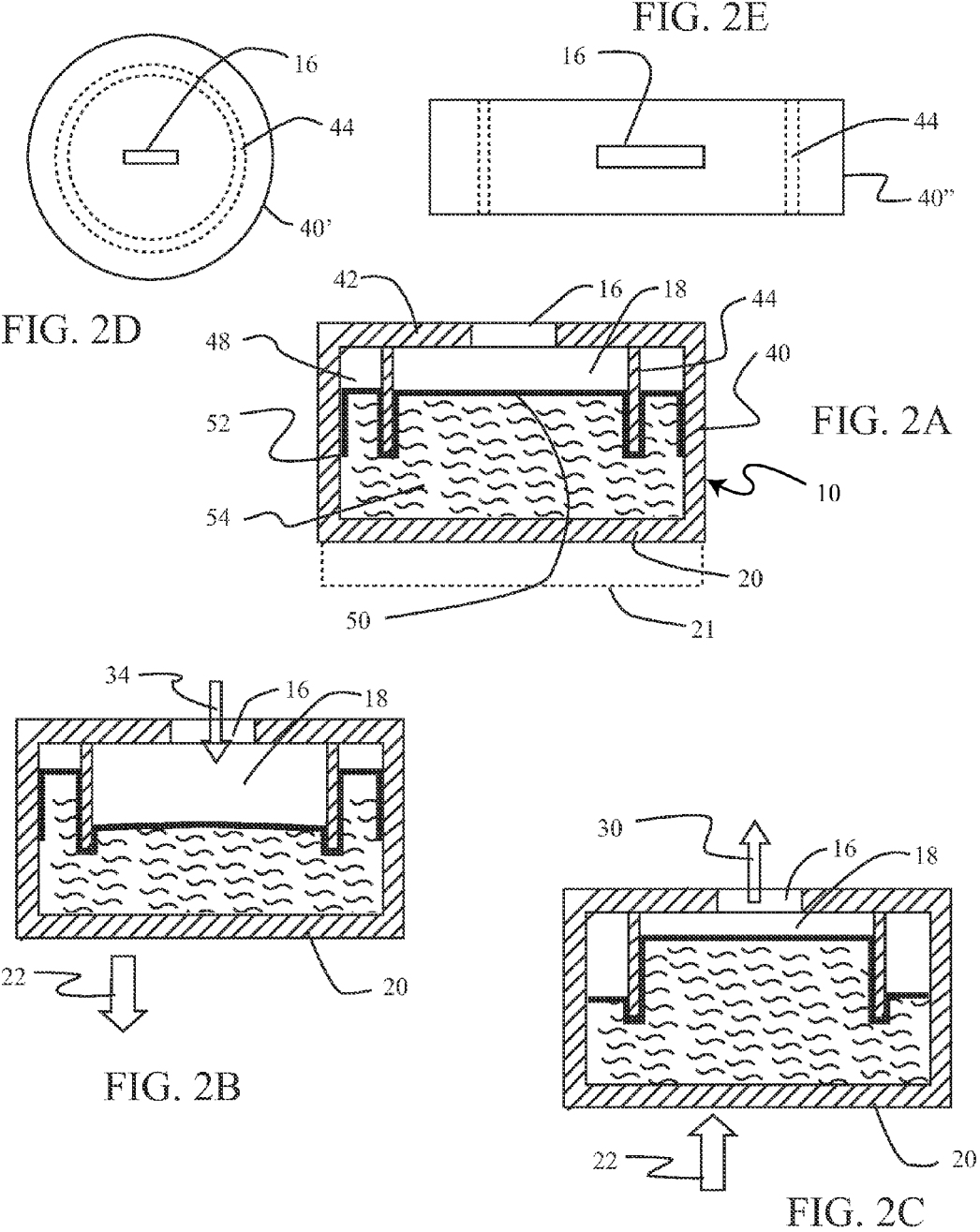

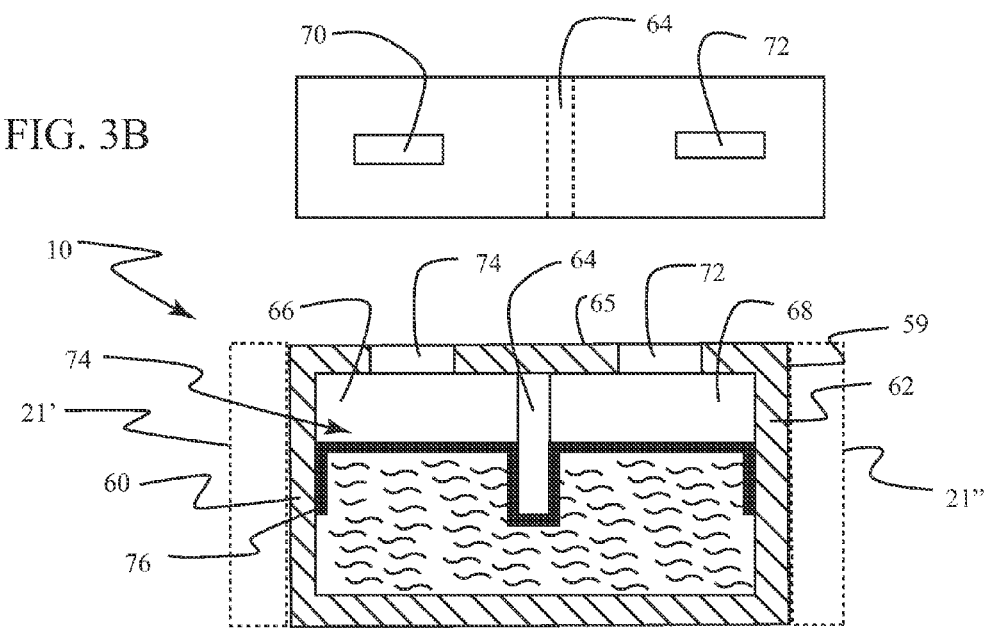
FIG. 3B
FIG. 3A
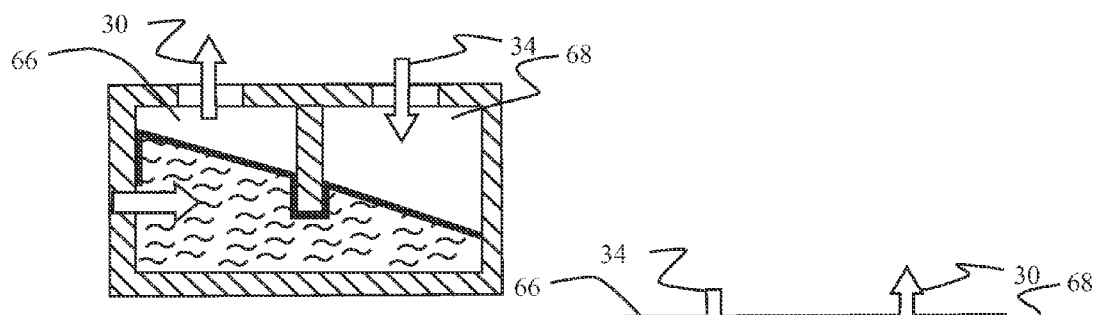
FIG. 3C
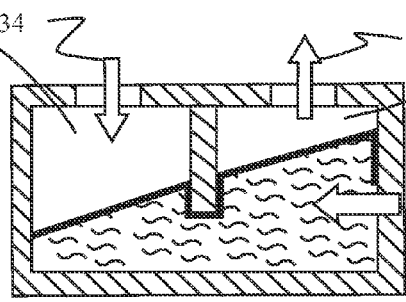
FIG. 3D

APPARATUS AND METHOD FOR AN IMPROVED SYNTHETIC JET ACTUATOR

BACKGROUND INFORMATION

1. Field

Embodiments of the disclosure relate generally to aerodynamic flow control and more particularly to embodiments for a synthetic jet actuation system for increasing the air flow velocity and air flow volume through resonant vibration of a fluid in a sealed cavity with a flexible diaphragm induced by a piezo actuator.

2. Background

Synthetic Jet Actuators (Net Zero Mass Actuators) are placed in an aerodynamic lifting surface to improve the aerodynamic efficiency of the lifting surface. A common method of generating a synthetic jet employs a cavity with an orifice formed by a hole or slot and an actuator closing the cavity opposite the aperture. An example synthetic jet generator consists of a sealed cavity with an orifice and an opposing flexible vibrating diaphragm. Actuator operation employs a cycle with two strokes; a suction and an ejection. During the suction stroke the diaphragm moves away from the orifice, increasing the volume of the cavity and subsequently decreasing the pressure within. During the ejection stroke, the diaphragm moves toward the orifice, resulting in the expulsion through the orifice of fluid accumulated in the cavity during the suction stroke.

Two nondimensional variables the stroke ratio (L/d) and Reynolds number, Re, are the primary factors that influence synthetic jet performance. The ejected fluid is defined as $L/d \approx \Delta D^2/d^3$ where L is the length of a column of ejected fluid and d is the orifice diameter, D is the diaphragm diameter and $\Delta$ is the diaphragm displacement.

Thus increasing the diaphragm displacement, $\Delta$, will increase the stroke length and the corresponding exit velocity and momentum of the synthetic jet.

Current synthetic jet actuators employ Piezo electric actuators as the diaphragm. Presently Piezo electric actuators are manufactured with ceramics. They are noted for generation of large forces and small deflections. As alternating electrical voltage is applied, the Piezo will bend in different directions. Attempts at a solution for additional stroke length involve development of more flexible Piezo electric actuators that vibrate inside the cavity of the synthetic jet actuator to increase the exit jet stream velocity. Present technology is manufacturing Piezo electric bender actuators to be more flexible but their deflection or strains remain relatively small. This limits the diaphragm deflected motion of the synthetic jet actuator and limits the available performance.

It is therefore desirable to provide a system which enhances the deflected motion of the diaphragm in a synthetic jet actuator for increased performance.

SUMMARY

Embodiments disclosed herein provide a synthetic jet actuator which employs a case having a cavity with an orifice. An intermediate interface is contained within the case adjacent the cavity. The intermediate interfaced is excited in a sloshing mode to expand or reduce the volume of the cavity thereby entraining air into or expelling air from the cavity.

In exemplary embodiments, the intermediate interface comprises a fluid chamber containing a fluid to be excited and separated from the cavity with a diaphragm. In alternative embodiments, the intermediate interface may employ a gelatin like substance which may allow elimination of the diaphragm.

For one embodiment, the intermediate interface further includes an inner actuation chamber adjacent the cavity and a circumferential reaction chamber. The case includes an upper cavity wall and a wall depending from the upper cavity wall separating the inner actuation chamber and the circumferential reaction chamber. The diaphragm extends from the case across the circumferential reaction chamber, around a lip of the depending wall and across the inner actuation chamber. Excitation of the fluid in sloshing mode results in alternating displacement of the fluid between the circumferential reaction chamber and inner actuation chamber.

In certain embodiments, the case incorporates a bottom surface which is resilient for excitation by a Piezo electric actuator. In other embodiment, the case incorporates a ceramic surface of a Piezo electric actuator as the bottom surface.

In an alternative embodiment, the case has a first cavity with a first orifice and a second cavity with a second orifice. The intermediate interface within the case is then adjacent the first and second cavities and when excited in a sloshing mode alternately expands or reduces the volume of the first cavity and second cavity.

As in the first embodiment, the intermediate interface may incorporate a fluid chamber containing a fluid to be excited and separated from the first cavity and second cavity with a diaphragm. The case may then employ a cover and a divider depending from the cover separating the first and second cavities. The diaphragm extends from the case across the first cavity, around a lip of the divider and across the second cavity. Excitation of the fluid in sloshing mode results in alternating displacement of the fluid between the first cavity and second cavity.

In an exemplary implementation, the case includes a first side wall adjacent the first cavity and a second side wall adjacent the second cavity with the first and second side walls adapted to alternately induce excitation in the intermediate interface. This may be accomplished with the first and second side walls being resilient for excitation by associated first and second Piezo electric actuators or with the first and second side walls being the ceramic surfaces of a first and a second Piezo electric actuator.

In an aircraft implementation, the synthetic jet actuator is a sealed cavity located on the inside surface of an airfoil skin, which incorporates a rigid walled hollow chamber having an open end and a closed end. The rigid walled hollow chamber is attached at the open end to the inside surface of the airfoil skin. A flexible diaphragm extends across the rigid walled hollow chamber located between the open end and the closed end. An orifice extends through the airfoil skin into the rigid walled hollow chamber. A fluid contained within the cavity formed between the closed end and the flexible diaphragm is excited in a sloshing mode and air is alternately entrained and expelled from the cavity formed between the flexible diaphragm and the inside surface of said airfoil skin. A Piezo electric actuator may be employed to excite the fluid in sloshing mode.

The rigid walled hollow chamber may be divided into multiple separate compartments with corresponding orifices or multiple hollow chambers may be separately arranged in an array under a surface.

A method for synthetic jet actuation employed by the various embodiments includes providing a case incorporating a cavity with an orifice and providing an intermediate interface adjacent the cavity. A slosh mode is then excited in the intermediate interface and air is expelled from the cavity during a first half cycle of the slosh mode and entrained into the cavity during a second half cycle of the slosh mode.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIG. 1A is a side section view of an idealized embodiment of a synthetic jet actuator in a quiescent state:

FIG. 1B is a side section view of the actuator of FIG. 1A in a first extreme point in slosh mode;

FIG. 1C is a side section view of the actuator of FIG. 1A in a second extreme point in slosh mode;

FIG. 2A is a side section view of a first embodiment of a synthetic jet actuator in a quiescent state;

FIG. 2B is a side section view of the actuator of FIG. 2A in a first extreme point in slosh mode;

FIG. 2C is a side section view of the actuator of FIG. 2A in a second extreme point in slosh mode;

FIG. 2D is a top view of a cylindrical implementation of the embodiment of FIG. 2A;

FIG. 2E is a top view of a rectangular implementation of the embodiment of FIG. 2A;

FIG. 3A is a side section view of a second embodiment of a synthetic jet actuator with transverse excitation in the quiescent state;

FIG. 3B is a top view of the actuator of FIG. 3A;

FIG. 3C is a side section view of the actuator of FIG. 3A in a first extreme point in slosh mode;

FIG. 3D is a side section view of the actuator of FIG. 3A in a second extreme point in slosh mode;

DETAILED DESCRIPTION

Figure 4:
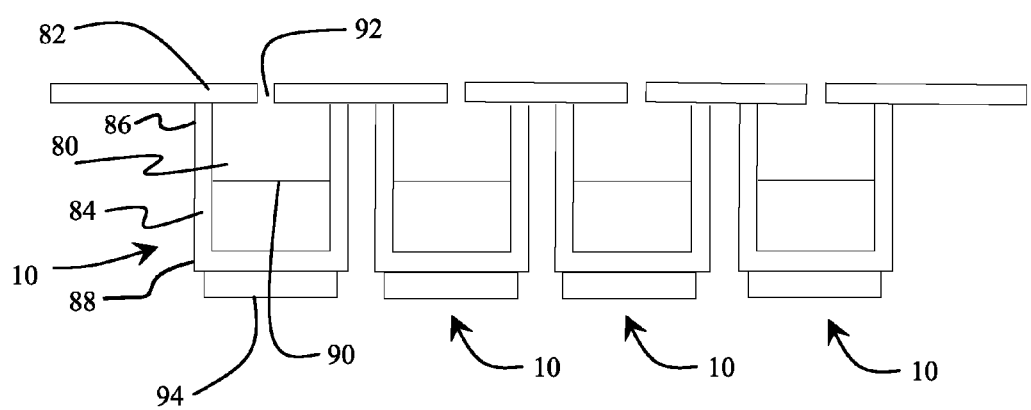
FIG. 4 is an exemplary implantation of an embodiment in an aircraft skin.

The embodiments described herein improve the performance of a synthetic jet. An increase in the magnitude of motion of an actuation diaphragm is created by an intermediate fluid interface. A Piezo electric actuator (referred to herein as a "Piezo") is employed as a vibrating first diaphragm to excite a fluid or gel in the intermediate interface, which in turns vibrates in a sloshing motion. The Piezo applies a vibratory motion to the fluid which is excited and starts to vibrate. The excitation frequency is adjusted to a frequency that corresponds to the fluid "sloshing mode" and the fluid vibrates with an amplitude and waveshape substantially displacing the entire surface of an actuation diaphragm. The actuator 10 is shown in an at rest condition in FIG. 1A with the fluid 12 in a quiescent equal level under an idealized membrane 14 spaced from an orifice 16 exiting cavity 18. The fluid as constrained by the membrane creates an intermediate interface 19 between a bottom actuating surface 20 of the actuator on which the Piezo operates (represented by arrow 22) and the operating cavity 18. As shown in FIG. 1B, the "sloshing mode" initiated by action of the Piezo acting on a bottom surface 20 responds during the "upstroke" with a peak amplitude 24 at the center of the fluid 26 and the fluid at the edges 28 recedes to a minimum amplitude. Due to the conservation of fluid in the intermediate interface, the peak amplitude causes a "convex" shape/mode with the fluid along the edges moving toward the center during the "upstroke" and this motion expels air contained in the cavity 18 (as represented by arrow 30) from orifice 16 in the actuator 10.

The excited fluid or "sloshing mode" continues with the "downstroke" motion as shown in FIG. 1C. The "downstroke" results in a "concave" fluid surface with a minimum fluid height 32 in the center fluid and this motion sucks air in through the orifice 16 (as represented by arrow 34. The fluid along the edges 36 is at its maximum position during the "downstroke". The frequency of the sloshing fluid is controlled by varying the density of the fluid, the height of the fluid, width of the chamber and length of the chamber. The addition of the membrane exerts a compressive force on the fluid and increases the frequency of the sloshing fluid. The performance of the synthetic jet can be optimized by changing the membrane material and tension; changing the fluid or gel material; and changing the cavity size and shape.

A synthetic jet actuator may be employed on surfaces which are not perpendicular to a reacting force such as gravity, for example an aircraft which flies at various angles. To allow use of the present embodiments of the actuator it is necessary to constrain the fluid in the intermediate interface with a surface or flexible membrane. Membrane 14 in FIGS. 1A-1C is shown in a "perfect" or idealized form allowing complete motion of the fluid edges. Excitation or vibration of a "gelatin like" substance allows elimination of a separate diaphragm or membrane relying on the cohesive surface of the gelatin to maintain the intermediate interface in alternative embodiments.

Actual implementation of a case and diaphragm for constraining the fluid may take several forms. A first embodiment of an exemplary actuator and associated operating sequence is shown in FIGS. 2A-2C. Actuator 10 has a bottom surface 20 for excitation by a Piezo 21. For exemplary embodiments, the bottom surface may be the ceramic surface of the Piezo itself or a resilient surface sufficiently flexible to deform under excitation by the Piezo. A case 40 extends from the bottom surface and is capped by upper cavity wall 42 through which orifice 16 penetrates. An inner wall 44 depends from the upper cavity wall 42 concentric with the case 40 to form an inner actuation chamber 18 and a circumferential reaction chamber 48 in the intermediate interface. A diaphragm 50 formed from rubber or silicone or other highly elastic membrane is attached to the case 40 at an intermediate circumference 52 sealing the intermediate interface (relative thickness of the diaphragm has been exaggerated for clarity). In a quiescent state as shown in FIG. 2A, the diaphragm 50 extends up the inner surface of the case, across the reaction chamber 48, around the lip of the inner wall 44 and across the actuation chamber 18 containing the fluid 54 in the intermediate interface separated from the actuation cavity 18. The membrane diaphragm tension can be varied to change the frequency of the sloshing mode.

As described with respect to the idealized embodiment of FIGS. 1A-1C, the piezo is employed for excitation of the fluid in the intermediate interface into a sloshing mode. At one extreme of the mode, as shown in FIG. 2B, the fluid in the outer circumferential region of the intermediate interface has been displaced upward into the reaction chamber while the fluid in the central region of the intermediate interface is displacing downward increasing the volume of the actuation cavity 18 and drawing in air as represented by arrow 34. At the opposite extreme of the mode, as shown in FIG. 2C, the fluid in the central region of the intermediate interface has displaced upward and the incompressible volume of the fluid as constrained by the diaphragm results in downward displacement of fluid in the outer circumferential region. The upward displacement of the fluid in the inner actuation chamber reduces the volume of the actuation cavity 18 thereby expelling air from the cavity as represented by arrow 30.

Amplification of the excitation created by the Piezo through the sloshing mode resonance in the fluid significantly enhances the volumetric change in the actuation cavity thereby improving performance of the synthetic jet actuator. Resulting increase in the exit velocity and fluid momentum improve the effectiveness of the synthetic jet and allow it to be more efficient. The geometric implementation of the embodiment described in FIGS. 2A-2C can employ a cylindrical case 40' as shown in FIG. 2D or a rectangular case 40" as shown in FIG. 2E. Orifice 16 is shown in the embodiments as a slot. However a circular orifice may be employed in alternative embodiments.

A second embodiment with transverse Piezo actuation is shown in FIGS. 3A-3D. For this embodiment actuator 10 includes case 59 which incorporates side walls 60, 62 and a central divider 64 depending from a cover 65 which segregates the actuation cavity into a left actuation cavity 66 and a right actuation cavity 68 with corresponding left orifice 74 and right orifice 72. Diaphragm 74 is attached to the case at an intermediate level 76 and deforms over central divider 64. Dual Piezos 21' and 21" operate juxtaposed on walls 60 and 62. As previously described with respect to the first embodiment, walls 60 and 62 may constitute the ceramic actuation surface of the Piezos or a resilient surface sufficiently flexible to deform under excitation by the Piezo. The external vibratory motion excites the dual chamber actuator in a lateral direction or a side-to-side motion. The vibration causes the fluid to slosh laterally from a first extreme position at a first peak in the slosh mode as shown in FIG. 3C to a second extreme position as shown in FIG. 3D. The lateral sloshing motion causes one chamber to fill with fluid displaced from the other chamber in a first half cycle. The flow is then reversed in a second half cycle. The chamber that has an increase in fluid reduces the volume of the corresponding actuation cavity and expels the air out the associated orifice. The chamber that has the receding fluid expands the volume of the associated actuation cavity and draws air in through the associated orifice filling the cavity with air. When the fluid sloshes back the cycle is repeated and the cavity that just drew the air in is reduced in volume expelling the air and the cavity that expelled the air now is expanded drawing air in. The cycle will continue and be repeated.

In exemplary implementations of the embodiments disclosed, a cavity size of approximately 2 inch×5 inch planform and 3 inches in height with an orifice size approximately ¹⁄₁₆ inch wide by ½ inch was employed. Slot sizing ranging from approximately 0.005×0.040 inch to 0.0625×0.5 in with chamber sizes associated with the orifices of 0.03 cubic inches to 30 cubic inches are anticipated in exemplary operational synthetic jets. Larger or smaller orifice and cavity sizes may be employed for specific applications. For the embodiment of FIGS. 2A-2D a slosh mode frequency of approximately 5 Hz was employed. Similarly for the embodiment of FIGS. 3A-3D a slosh mode frequency of approximately 11 Hz was employed. For smaller cavities and orifice sizes, significantly higher slosh mode frequencies may be achieved.

Referring to FIG. 4, an exemplary implementation of synthetic jet actuators employing the embodiments disclosed herein incorporates multiple actuators 10 each with a sealed cavity 80 located on the inside surface of an airfoil skin 82. Each sealed cavity is incorporated in a rigid walled hollow chamber 84 having an open end 86 and a closed end 88 attached at the open end to the inside surface of the airfoil skin. A flexible diaphragm 90 extends across the rigid walled hollow chamber located between the open and the closed end. An orifice 92 extends through the airfoil skin into the rigid walled hollow chamber. A fluid is contained within the cavity formed between said closed end and the flexible diaphragm. Excitation of the fluid in a sloshing mode by a Piezo 94 as previously described causes air to be alternately entrained into and expelled from the cavity formed between the flexible diaphragm and the inside surface of said airfoil skin. The synthetic jet embodiments as disclosed herein may be placed in aerodynamic lifting surfaces to improve the aerodynamic efficiency of the lifting surface.

Figure 5:
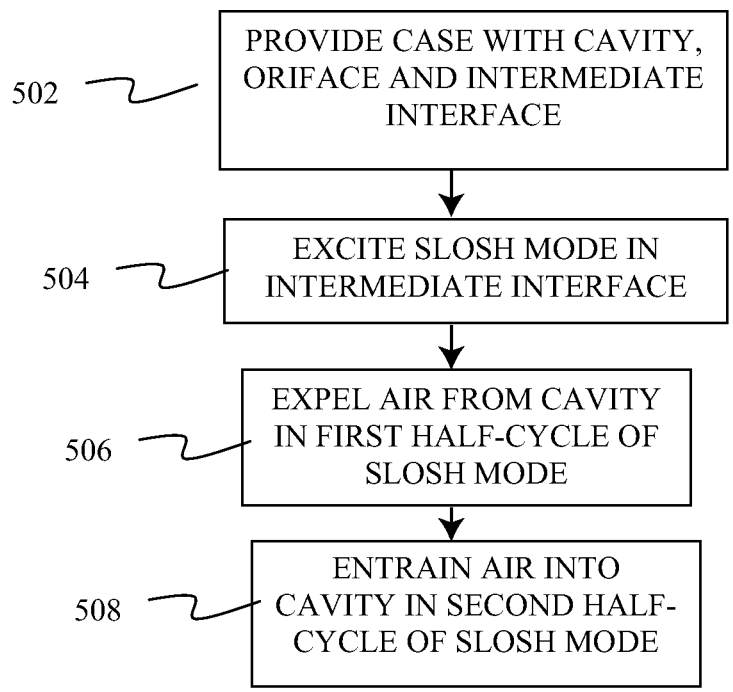
FIG. 5 is a flow chart of operation of an exemplary embodiment of a synthetic jet actuator.

Operation of the synthetic jet actuators of the present embodiment is represented in FIG. 5. A case is provided incorporating a cavity with an orifice and an intermediate interface adjacent the cavity, step 502. A slosh mode is excited in the intermediate interface, step 504. Air is then expelled from the cavity during a first half cycle of the slosh mode, step 506, and entrained into the cavity during a second half cycle of the slosh mode step 508. For the exemplary embodiments, the intermediate interface includes a fluid with a sealing membrane adjacent the cavity or a gel like substance with a sealing membrane adjacent the cavity.

For the first embodiment described above, the case is further provided with a circumferential reaction chamber and a central actuation chamber. Exciting a slosh mode allows displacing fluid in the outer circumferential region of the intermediate interface upward into the reaction chamber while the fluid in the central region of the intermediate interface is displacing downward increasing the volume of the actuation cavity. The second half cycle of the slosh mode allows displacing the fluid in the central region of the intermediate interface upward while displacing fluid in the outer circumferential region downward with displacement of the fluid in the inner actuation chamber reducing the volume of the actuation cavity.

For the second embodiment described above, the case is further provided with side walls and a central divider depending from a cover which segregates the actuation cavity into a left actuation cavity and a right actuation cavity with corresponding left orifice and right orifice. A diaphragm is attached to the case at an intermediate level deforming over the central divider. Exciting a slosh mode then allows displacing fluid in the intermediate interface upward adjacent the first cavity decreasing the volume of the first cavity while displacing the fluid in the intermediate interface adjacent the second cavity downward increasing the volume of the second cavity. In the second half cycle of the slosh mode, displacing fluid in the intermediate interface upward adjacent the second cavity decreases the volume of the second cavity while displacing the fluid in the intermediate interface adjacent the first cavity downward increases the volume of the first cavity.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:
1. A synthetic jet actuator comprising:
   a sealed cavity located on the inside surface of an airfoil skin wherein the sealed cavity is incorporated in a rigid walled hollow chamber having an open end and a closed end, and attached at said open end to the inside surface of said airfoil skin,
   a flexible diaphragm extending across said rigid walled hollow chamber, engaging an intermediate circumfer- ence of an inner wall and located between said open and said closed end to seal the cavity,
an orifice extending through the airfoil skin into the rigid walled hollow chamber, and
a fluid contained within a second cavity formed between said closed end and said flexible diaphragm,
wherein, upon excitation of said fluid in a sloshing mode, air is alternately entrained and expelled from the cavity formed between the flexible diaphragm and the inside surface of said airfoil skin.

2. The synthetic jet actuator of claim 1, wherein a Piezo electric actuator excites the fluid in sloshing mode.

3. The synthetic jet actuator of claim 1, wherein the fluid is a gelatin like material.

4. The synthetic jet actuator of claim 1, wherein the rigid walled hollow chamber is divided into a plurality of separate compartments and with a plurality of orifices.

5. A method for synthetic jet actuation comprising:
providing a case incorporating a cavity with an orifice;
providing a circumferential reaction chamber and a central actuation chamber;
providing an intermediate fluid interface adjacent the cavity;
exciting a slosh mode in the intermediate fluid interface by acting on a bottom actuating surface of the case with a piezo electric actuator alternatingly:
displacing fluid in the outer circumferential region of the intermediate interface upward into the reaction chamber while the fluid in the central region of the intermediate interface is displacing downward increasing the volume of the actuation cavity; and
displacing the fluid in the central region of the intermediate interface upward displacing fluid in the outer circumferential region downward, displacement of the fluid in the inner actuation chamber reducing the volume of the actuation cavity; and,
expelling air from the cavity during a first half cycle of the slosh mode and entraining air into the cavity during a second half cycle of the slosh mode.

6. A method for synthetic jet actuation comprising:
providing a case incorporating a cavity with an orifice;
providing side walls and a central divider depending from a cover which segregates the actuation cavity into a left actuation cavity and a right actuation cavity with corresponding left orifice and right orifice, attaching a diaphragm to the case at an intermediate level, said diaphragm deforming over the central divider;
exciting a slosh mode in the intermediate fluid interface by acting on a bottom actuating surface of the case with a piezo electric actuator alternatingly:
displacing fluid in the intermediate interface upward adjacent the first cavity decreasing the volume of the first cavity while displacing the fluid in the intermediate interface adjacent the second cavity downward increasing the volume of the second cavity; and
displacing fluid in the intermediate interface upward adjacent the second cavity decreasing the volume of the second cavity while displacing the fluid in the intermediate interface adjacent the first cavity downward increasing the volume of the first cavity; and,
expelling air from the cavity during a first half cycle of the slosh mode and entraining air into the cavity during a second half cycle of the slosh mode.

* * * * *